(12) United States Patent
Linden et al.

(10) Patent No.: US 6,549,773 B1
(45) Date of Patent: Apr. 15, 2003

(54) METHOD FOR UTILIZING LOCAL RESOURCES IN A COMMUNICATION SYSTEM

(75) Inventors: Mikael Linden, Tampere (FI); Teemu Kurki, Lempäälä (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/399,579

(22) Filed: Sep. 20, 1999

(30) Foreign Application Priority Data

Sep. 21, 1998 (FI) ................................ 982031

(51) Int. Cl.[7] ............................... H04Q 7/20
(52) U.S. Cl. .............. 455/426; 455/412; 455/517; 455/558; 370/328; 370/338; 370/401; 709/230; 709/227; 709/228
(58) Field of Search ................ 455/558, 412, 455/517, 426; 370/328, 338, 401; 709/230, 227, 228

(56) References Cited

U.S. PATENT DOCUMENTS

| | | | |
|---|---|---|---|
| 4,868,846 A | 9/1989 | Kemppi | 379/144 |
| 5,266,782 A | 11/1993 | Alanara et al. | 235/380 |
| 5,315,635 A | 5/1994 | Mukari | 379/58 |
| 5,353,328 A | 10/1994 | Jokimies | 379/58 |
| 5,448,622 A | 9/1995 | Huttunen | 379/58 |
| 5,487,084 A | 1/1996 | Lindholm | 375/215 |
| 5,600,708 A | 2/1997 | Meche et al. | 379/59 |
| 5,956,633 A | 9/1999 | Janhila | 455/410 |
| 6,011,976 A | * 1/2000 | Michaels et al. | 455/466 |
| 6,253,326 B1 | * 6/2001 | Lincke et al. | 713/201 |

FOREIGN PATENT DOCUMENTS

| | | |
|---|---|---|
| WO | WO 94/30023 | 12/1994 |
| WO | WO 97/36437 | 10/1997 |
| WO | WO 98/27767 | 6/1998 |

* cited by examiner

Primary Examiner—William Trost
Assistant Examiner—Danh Le
(74) Attorney, Agent, or Firm—Perman & Green, LLP

(57) ABSTRACT

The invention relates to a method in data transmission between a first mobile station (MS, MS1, MS2), a second mobile station (MS, MS1, MS2), and advantageously also a server (3, SERVER), wherein the first mobile station (MS, MS1, MS2) and the second mobile station (MS, MS1, MS2) comprise protocol means (100–106) for generating and directing a request (REQUEST) which contains at least address information (URI, URL, URN) for identifying the destination of the request (REQUEST), and wherein at least the first mobile station (MS, MS1, MS2) comprises a first local resource (SC, 4), such as a smart card, connected to the same. In the information, the address information (URI, URL, URN) of the request (REQUEST) is established to identify said first local resource (SC, 4), and the request (REQUEST) is generated and directed at least partly with the help of said protocol means (100–106).

17 Claims, 7 Drawing Sheets

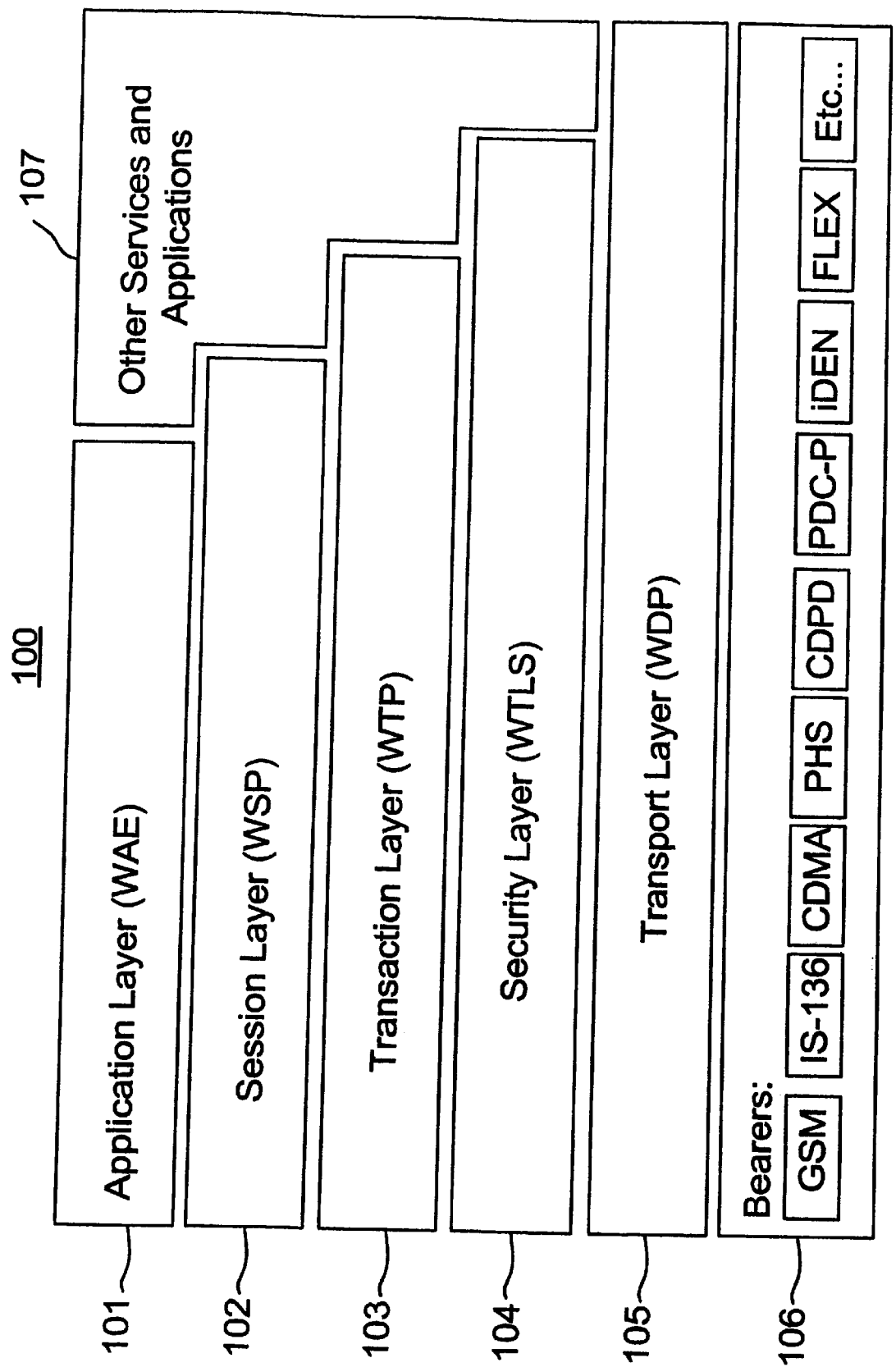

METHOD FOR UTILIZING LOCAL RESOURCES IN A COMMUNICATION SYSTEM

Figure 1:
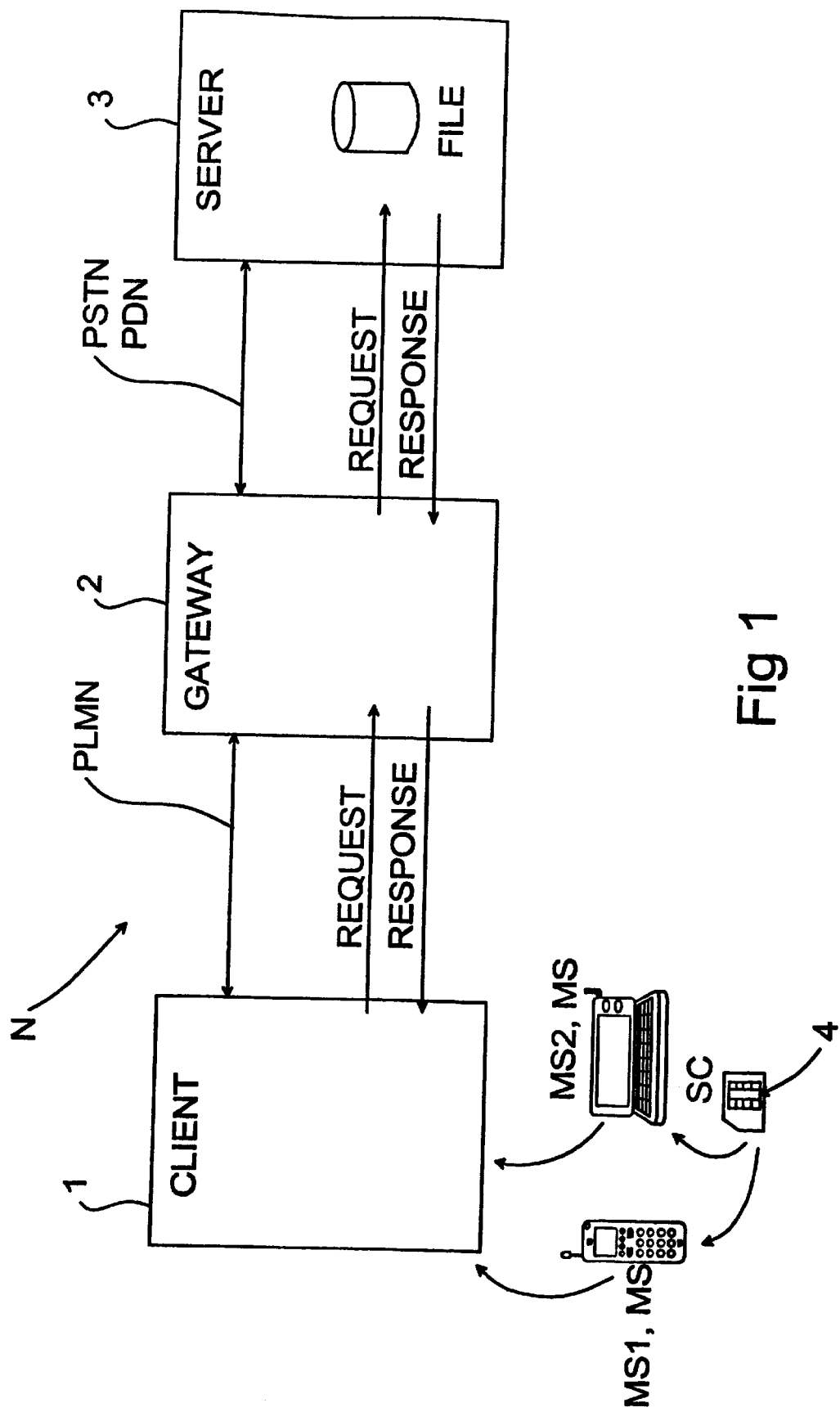

The present invention relates to a method in a communication system according to the preamble of claim 1. The invention also relates to a communication system according to the preamble of claim 11. Furthermore, the invention relates to a wireless communication device according to the preamble of claim 12.

There are known wireless communication systems, such as the PLMN (Public Land Mobile Network), which is a communication network based on a cellular system. One example that can be mentioned is the GSM 900 mobile communication network according to the GSM standard (Global System for Mobile Communications). The cells of the communication network are distributed within a wide geographical area, and mobile stations (MS), such as mobile phones, which are connected to the communication network via base stations BS, move from one cell to another. These mobile phones are distinguished from each other by means of a subscriber-specific identification code, wherein communication, such as data transmission or an audio call, is possible between two mobile stations. The identification code is, for instance, an IMSI code (International Mobile Subscriber Identity). The communication network takes care of routing information via base stations and mobile services switching centers (MSC), by utilizing register data which indicate the location of the mobile station in the area of the cells of different base stations. Furthermore, the following wireless communication networks should be mentioned: GSM-1800, GSM-1900, PDC, CDMA, US-TDMA, IS-95, USDC (IS-136), iDEN (ESMR), DataTAC, and Mobitex.

In order to perform data transmission and processes connected with data transmission in communication devices, such as servers and wireless communication devices, which are connected to a communication network, a set of communication rules must be available for defining the allowed messages and the function of the participants of the data transmission at the different stages of the communication. As is well known, one such set of communication rules in data transmission is a protocol used by the devices to communicate with each other. For data transmission especially in wireless communication networks, a wireless application protocol WAP is developed, which will be used as an example in the following specification. One version of the WAP application protocol is specified in the WAP Architecture Version Apr. 30, 1998 publication (Wireless Application Protocol Architecture Specification; Wireless Application Protocol Forum Ltd, 1998), which is published in the Internet, and which includes for example a description on the architecture of the WAP application protocol. By means of the WAP application protocol, it is possible to define a series of protocols on different levels, which can be used to develop new services and devices e.g. for digital mobile communication networks based on a cellular network. For example, the WAP application protocol has already been developed for SMS services (Short Messaging Service), USSD services (Unstructured Supplementary Services Data), CSD services (Circuit Switched Data), and GPRS services (Global Packet Radio System) of the GSM network, and for the services of the IS-136 and PDC network.

The WAP application protocol is designed to describe those standard components that enable data transmission especially between mobile stations (client) and servers of the communication network (origin server). In order to gain access to servers located in the WWW network, the WAP uses a gateway which also functions as a proxy containing functions for data transmission between a WAP protocol stack and a WWW protocol stack (HTTP, TCP/IP), as well as functions for coding and decoding the content (WML, Wireless Markup Language, or HTML) of the information for data transmission. In the WAP, specified presentation formats are used to define the content of the information and the applications. The content is transferred using standardized data transmission protocols. A so-called browser or a microbrowser is used in the wireless communication device to control a user interface (UI).

The application layer in the architecture of the aforementioned WAP application protocol applies a defined architecture of a wireless application environment WAE. The purpose of the WAE application environment is to provide operators and service providers with an open environment, by means of which it is possible to create a large group of services and applications on top of different wireless communication methods functioning as a platform. The different WAE applications of communication devices follow a procedure used in the Internet World Wide Web (WWW) network, in which different applications and information are presented by means of standardized presentation formats and browsed for example with known WWW browsers. Consequently, in order to use different resources of communication devices, the servers and the information of the Internet network are labelled with a URI address (Uniform Resource Identifier) which is independent of the location, and the presentation format of the information is supported by the browser used, and is, for example, HyperText Markup Language (HTML) or JavaScript. On the other hand, the WAE application environment especially takes into account the requirements of the wireless communication devices and wireless communication networks. At present, according to prior art, the WAE applications (user agents), such as browsers, only support the WSP/B protocol. For example browsers communicate with a gateway server via a WSP layer (Wireless Session Protocol) of the WAP protocol stack, which will be described later. The gateway, in turn, provides functions for converting the data transmission protocol so that access to the resources of a WWW server using the HTTP protocol would be possible. According to prior art, the WAP protocol stack is described in more detail in the aforementioned publication, and the WAE application environment is described in more detail e.g. in the WAP WAE Version Apr. 30, 1998 publication, published in the Internet (Wireless Application Protocol Wireless Application Environment Overview; Wireless Application Protocol Forum Ltd, 1998).

The URI addresses are used to locate resources by providing the location of the resource with an abstract identification. When the resourse is located, the system can subject the resource to different procedures which depend on the application and on the purpose of pursuing access to the resource. As is well known, several different data transmission protocols are used in this context, of which for example the HTTP (HyperText Transport Protocol), FTP (File Transfer Protocol), MAILTO (Electronic Mail Address), and GOPHER (The Gopher Protocol) can be mentioned.

As is well known, the URL address used by the HTTP is utilized to indicate resources which are available in the Internet network, for example in its servers, by using an HTTP data transmission protocol, and it has the format:

http://<host>:<port>/<path>, in which the data transmission protocol used can be deduced from the "http" part, "<host>" represents the domain name or the IP address (Internet Protocol) of the server in the communication network, "<port>" represents the number of the port, and it can also be left out, because data transmission protocols use a default port. Furthermore, "<path>" describes the resource in question in more detail and functions as a selector in the HTTP. The prefix "//" illustrates that the address follows the data transmission protocols used in the Internet network. A more precise indication of the resources by means of the "<path>" part varies in different data transmission protocols, and in addition to that, it is possible to provide a "<user>" part between the "//" and "<host>" parts to indicate the user, as in the FTP, and a "<password>" part to indicate a password. The resource can also be identified by means of a URN name (Uniform Resource Naming), wherein it is possible to use only a name instead of a URL address, and the URN name is modified to a URL address when necessary. The URI address and the protocol (access algorithm) to be used, form a URL address (Uniform Resource Locator) to identify the resource.

As is well known, resources refer to a area (such as a directory or a file), a program (such as an application), or a peripheral device (such as a printer) allocated in the server of the data transmission network for collective use. In the prior art, however, problems often occur which relate especially to the use of these local resources. These local resources can include for example content and files, as well as applications contained in the same communication device, and peripheral and auxiliary devices connected to the same. Local resources can also be located in a peripheral device, such as a SIM card (Subscriber Identity Module) or a smart card, connected to a wireless terminal, such as a mobile phone. At present, for example the WAP application protocol contains no specification for methods for utilizing these local resources coupled to a wireless communication device.

In connection with WWW communication networks, there are such known agents as for example the WWW browsers Netscape Navigator and Microsoft Internet Explorer. A function known from the Navigator browser is the viewing of local files which are stored in the local hard disc of a data transmission device, typically a computer. The browser opens a file stored on the hard disc, reads its content and presents it in an intelligible format to the user. This browsing of files is implemented as an extension to the browser. Consequently, all necessary command primitives and references to the services (i.e. system functions) provided by the operating system software controlling the actual operation of the device, are built in the program code of the browser in order to implement the browsing of files. This can be implemented for example by means of a so-called standardized API interface, i.e. an application programming interface.

In the WAE application environment, the above-described facts would entail for example that an API interface was arranged for each WAE application of a wireless communication device for coupling to a smart card. Correspondingly, the interface of the smart card would be responsible for transmitting low-level commands (command APDU) to the smart card. The responses given by the card are then transmitted back to the application via interfaces. Known methods to attend to the coupling are the Open Card Framwork specification and the PC/SC specification. However, the specifications differ from each other, and thus each WAE application should take the differences and various API interfaces into account.

Another possibility is to arrange the WAE application in such a way that it would be in direct communication with a resource, such as a smart card, which is physically coupled to the mobile station. This would mean that the WAE application would be responsible for transmitting command primitives (command APDU), the functions being programmed in the WAE application. This would create a significant problem, because it would be necessary to provide each WAE application with the necessary command primitives for each different local resource. This would also have the result that for new resources, the WAE applications would have to be supplemented with the necessary command primitives so that these resources could be implemented. That would create a significant need to update the WAE applications, a limited possibility to use the new resources, and a barrier to the implementation and development of new resources.

The purpose of the present invention is to provide a method that enables applications utilizing the used application protocol to gain efficiently access to local resources in a straightforward and efficient manner. A particular purpose of the invention is to introduce a new method to enable applications applying the WAP application protocol to gain access to local resources, which include for example a SIM card of a mobile station, or an attachable smart card.

The central principle of the invention is to utilize the protocol stack used in order to utilize local resources. Another central principle of the invention is to apply an indication corresponding e.g. to the URL address when referring to local resources.

The method in the communication system according to the invention is characterized in what will be presented in the characterizing part of the appended claim 1. The communication system according to the invention is characterized in what will be presented in the characterizing part of the appended claim 11. The wireless communication device according to the invention is characterized in what will be presented in the characterizing part of the appended claim 12.

A considerable advantage of the invention is, that it is possible to avoid including a standardized API interface or necessary command primitives in the application, and nevertheless, local resources can be utilized flexibly. Thus, for example the complexity of WAP applications is reduced considerably, and the implementation of applications in the mobile station is facilitated as well. The changes required to implement the invention in WAE applications are small, because the mechanisms already available in the WAE application (GET and POST methods, etc) are utilized. In the mobile station, the changes required by the invention can be advantageously implemented with changes in the application software which controls the functions of the mobile station.

The principle of the WAP application protocol is that a mobile station functioning as a client contacts a server which is located in the communication network. The advantage of the invention is that this principle can still be applied, wherein to gain access to the local resources, the application makes a request to the lower protocol layer and also receives a response which the server, in this case a local resource, has generated and transmitted to the client. A further advantage of the invention is that the principle can also easily be expanded for example in such a way that the local resource can receive requests from another mobile station or server too, not only from the one containing the smart card. In that case, the interface of the smart card functions like a server.

The local resource can also transmit requests to other mobile stations and servers, and, furthermore, also to the mobile station to which it is attached. The advantage therein is that the smart card, such as a SIM card, can transmit a request to the server, for example to update applications functioning in a SIM card from the server of the operator (download).

The principle of the invention can also be implemented in a situation where the smart card is communicating with another smart card. An example that can be mentioned is the transfer and relay of payments from one smart card to another. Thus, one of the smart cards can be connected to a server functioning in the network, and a protocol stack according to the invention is implemented in the server. By means of the "<host>" part of the URL address, it is possible to indicate said server. The user attaches the smart card into the mobile station, after which an application is activated for setting up a connection to the server, the application being loaded from the server and implemented for example by means of a WMLScript command language.

A particular advantage of the invention e.g. in connection with the WAP application protocol is that it is possible to efficiently utilize functions connected with the HTTP data transmission protocol of the WSP/B protocol already known as such. These include, for example, GET, PUT, and POST requests. Consequently, the header fields of the HTTP protocol can also be utilized in the data transmission, as well as the headers of the HTTP protocol for authentication. Correspondingly, it is possible to utilize efficiently the methods of the WWW communication network for authorization or data transmission.

A further advantage of the invention is that it can be used to conceal the structure and implementation of the local resource from the user of said resource. When several implementations of the local resource, for example a memory module, a smart card or both of them, are coupled to the mobile phone, their lower level interfaces typically are very different. By means of the invention it is possible to use them in the same way, because both resources appear to the user as servers with which communication is effected by means of the WSP/B protocol and via the interface (Local Resource Interface). Thus, the user does not have to understand the real structure of the resource, and the low level interface through which the communication takes place.

Figure 2B:
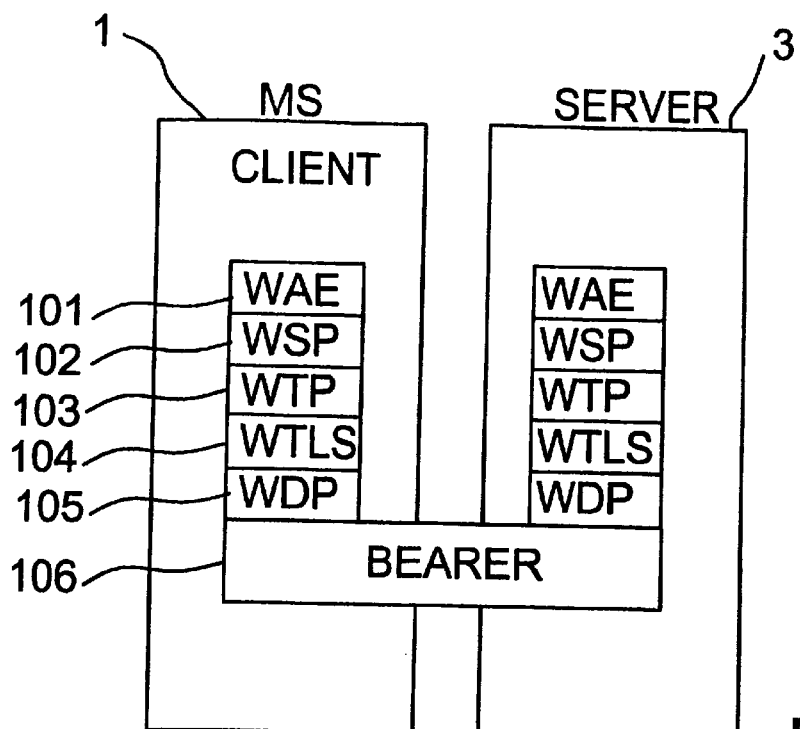
Figure 3:
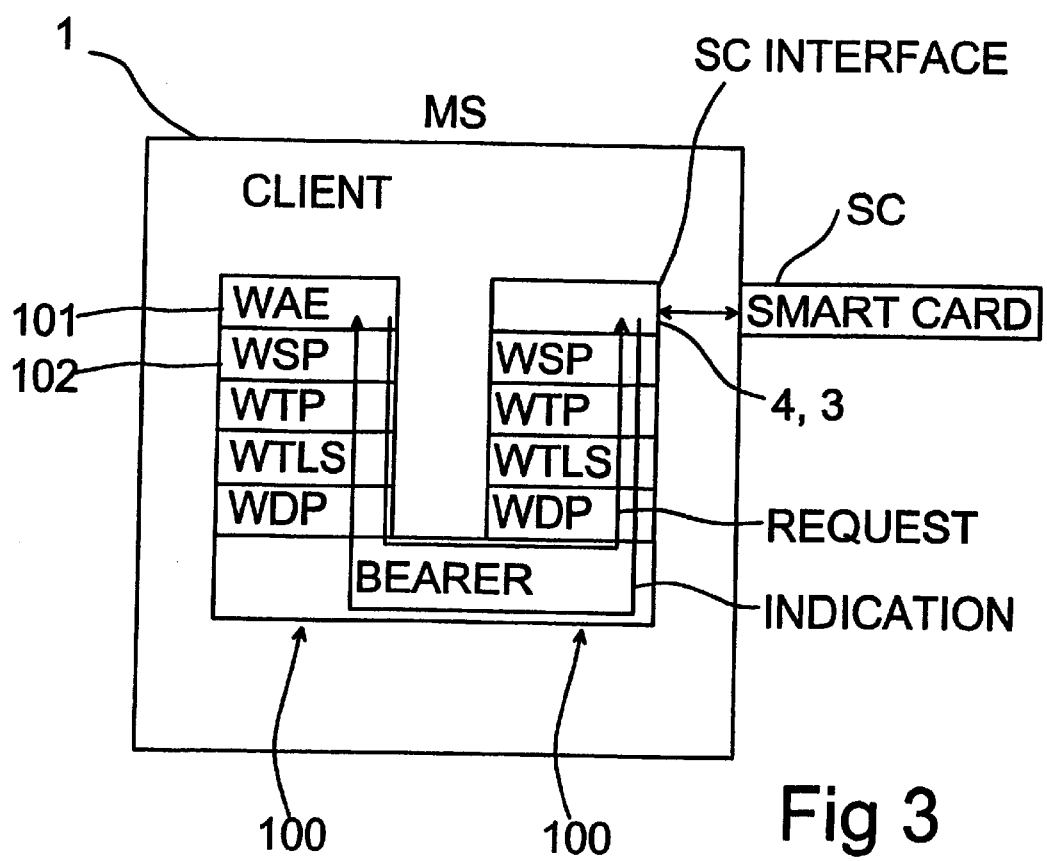
Figure 4:
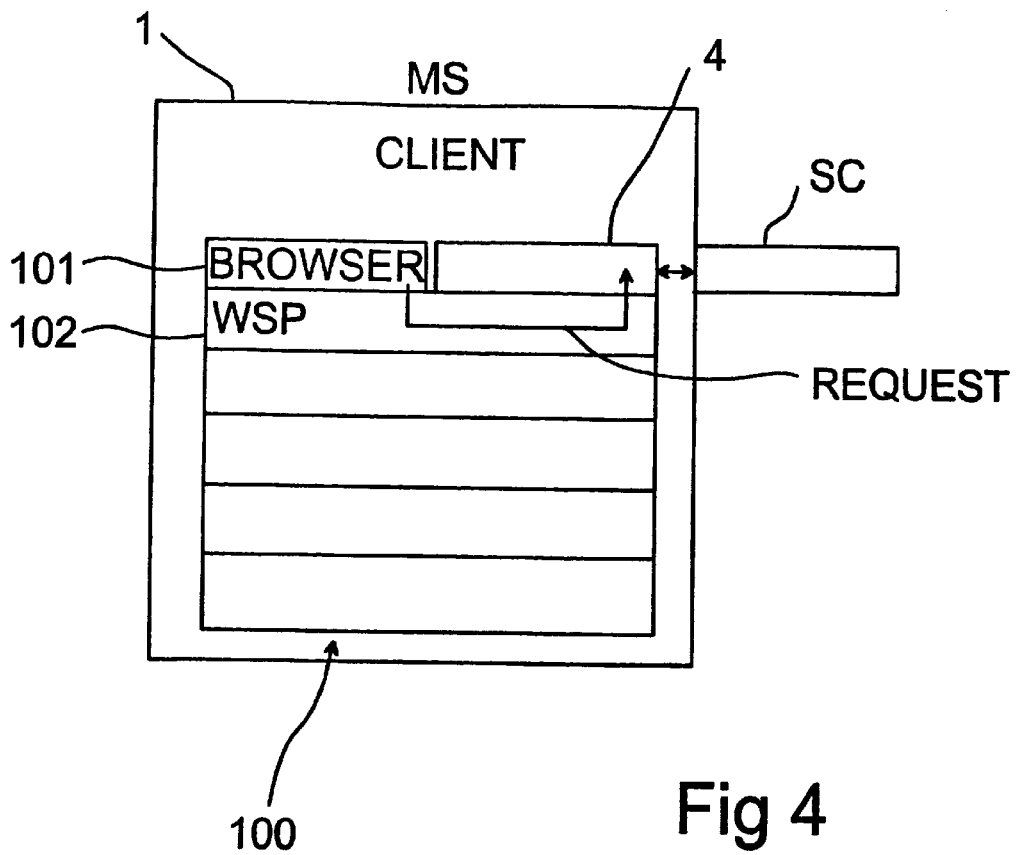
Figure 5:
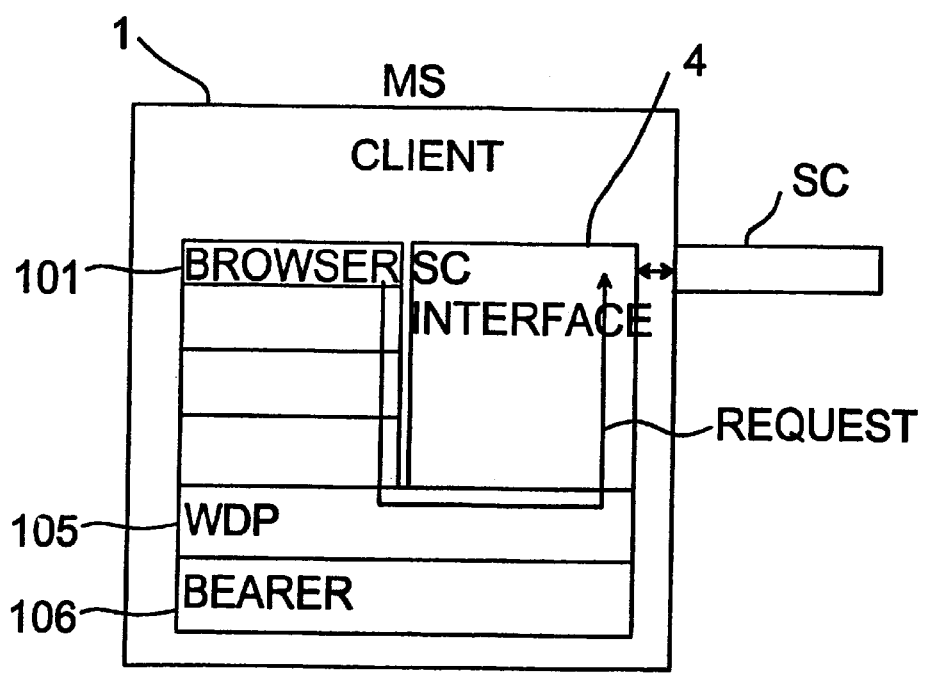
Figure 6:
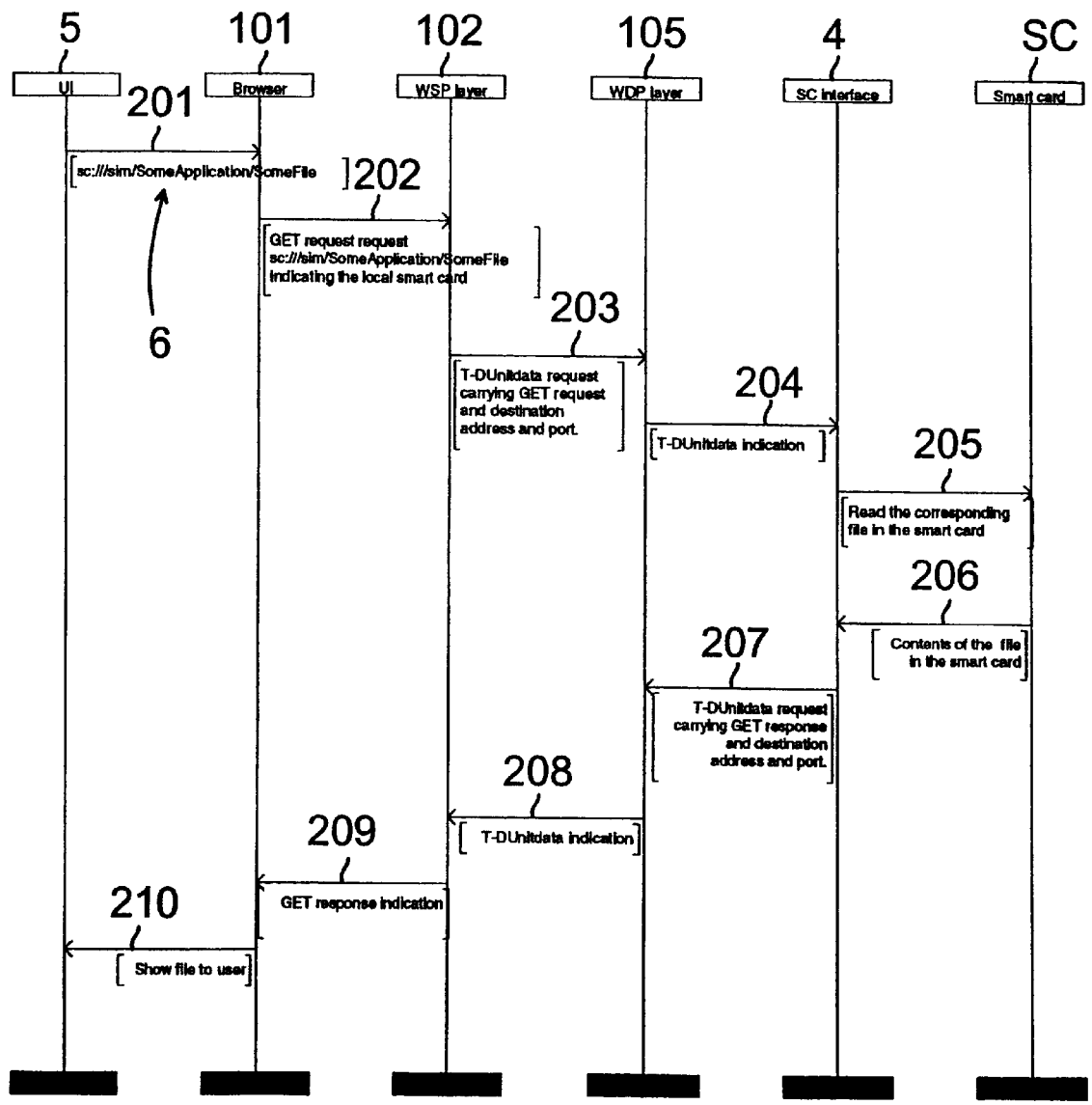
Figure 7A:
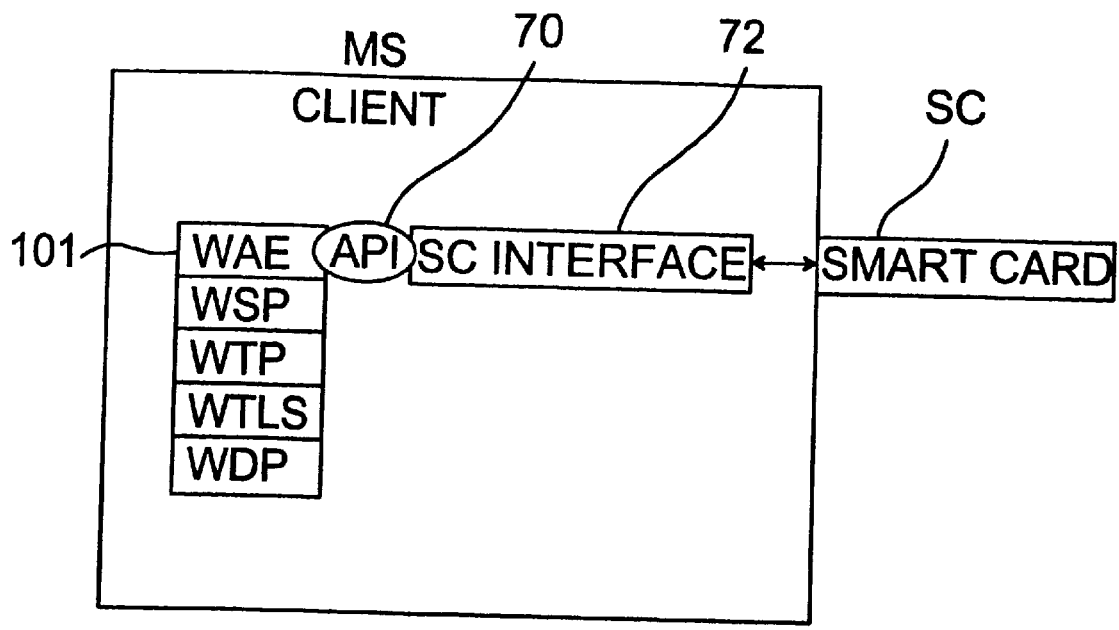
Figure 7B:
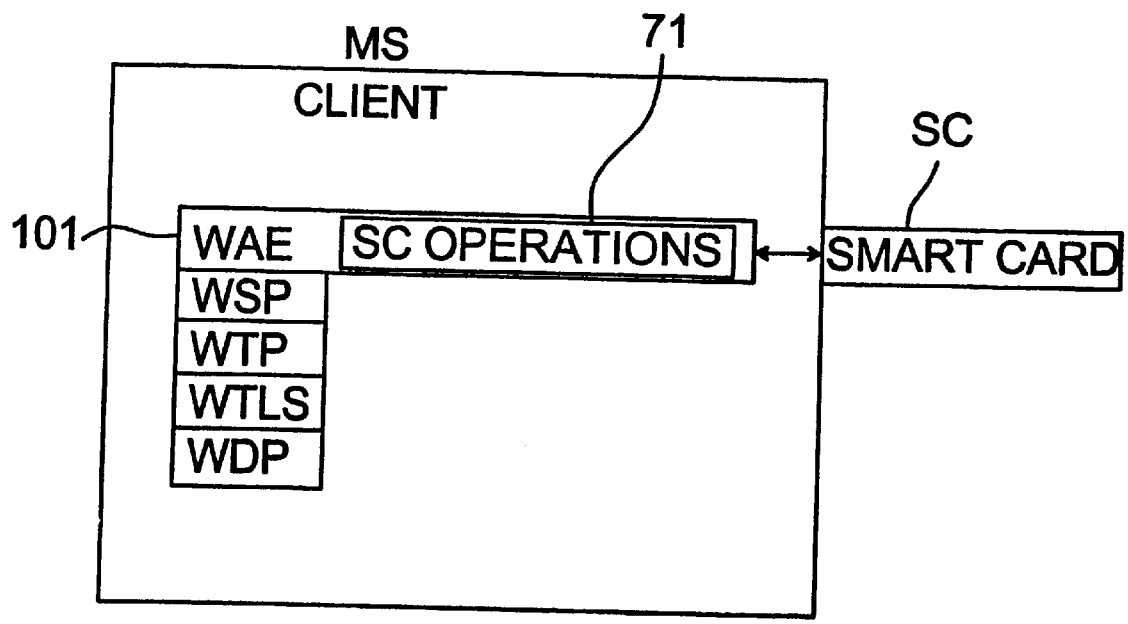
Figure 8:
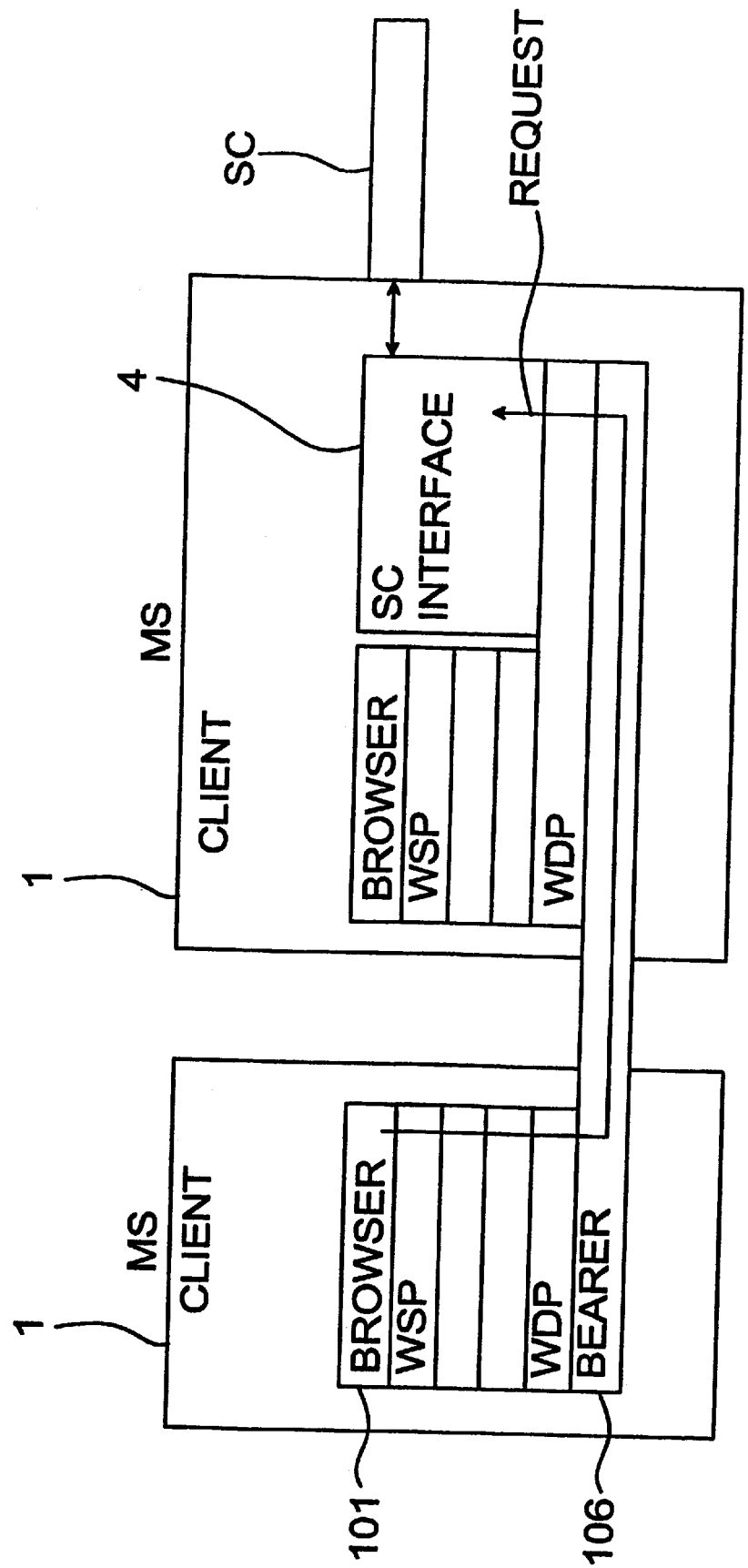

In the following, the present invention will be described in more detail with reference to the appended figures, in which FIG. 1 is a reduced diagram showing a communication system applying the invention, FIG. 2a shows a protocol stack of an application protocol applying the invention, FIG. 2b is a reduced diagram showing the application and logical structure of a protocol stack in the application protocol presented in FIG. 2a in implementing the client/server hierarchy, FIG. 3 is a reduced diagram showing the application and logical structure of the client/server hierarchy presented in FIG. 2b in the same wireless communication device, FIG. 4 is a diagram showing an implementation according to a first preferred embodiment of the invention, FIG. 5 is a diagram showing an implementation according to a second preferred embodiment of the invention, and FIG. 6 is a sequential diagram showing how a request and a response are generated and directed according to the invention in the embodiment according to FIG. 5, FIGS. 7a–7b illustrate alternative implementations for utilizing a local resource in connection of the protocol stack presented in FIG. 2a, and FIG. 8 is a diagram showing an implementation according to a third preferred embodiment of the invention.

FIG. 1 is a reduced diagram showing a communication system known as such in which it is possible to apply the invention. Communication devices, i.e. wireless communication devices MS1 and MS2, advantageously mobile stations (MS) function as clients 1 and are connected to a gateway 2, which is advantageously a server and which adapts the different data transmission protocols used to each other. The clients 1 utilize advantageously a public land mobile network (PLMN), such as the GSM network and the GSM GPRS network, in order to implement wireless data transmission. The base station subsystem (BSS) of the mobile communication network (PLMN) is known as such and comprises base transceiver stations (BTS) and base station controllers (BSC). The mobile station MS1, MS2 communicates with a base transceiver station via a radio channel, and the base transceiver station communicates further with a base station controller. The base station controller, in turn, communicates with a mobile services switching center (MSC). Mobile services switching centers can, in turn, communicate with each other and with servers in a public switched telephone network (PSTN). The base station controller can also communicate with a public packet data network (PDN). The aforementioned origin or content server 3 can be located either in the PSTN network or in the PDN network, wherein the gateway server 2 uses these networks in data transmission. The server 2 can communicate either with the base station subsystem or with the mobile services switching center in the PLMN network. Thus, the server 2 can be located either in the PLMN network itself or in the PSTN network, and it is obvious that the content server 3 and the gateway server 2 can be physically located in the same communication device. Furthermore, it is obvious that to implement the gateway 2, several separate servers can be used.

The invention can also be applied in a communication system in which the communication between different data transmission devices, such as servers 2 and clients 1, takes place by means of short distance IR data transmission (infrared), LPRF data transmission (Low Power Radio Frequency), SDRF data transmission (Short Distance Radio Frequency), or inductive data transmission, wherein data transmission distances in the range of a single communication network are typically shorter than in the mobile communication network.

Smart cards are typically small cards manufactured in the size of a credit card, which, laminated in plastic, contains a micro controller as well as electronic circuits and memory circuits required for the function of the micro controller. Furthermore, the surface of the card typically contains electrical contacts, via which it is possible to transmit operating voltages to the card and to transfer control and data signals between the card and a reading/writing device for the card. There are also known methods in which signals and operating voltages of the card are transmitted wirelessly, for example as high frequency electromagnetic signals, between the card and the reading/writing device for the card. Smart cards are used for example as charge cards in various applications, for example in public telephones, as change cards, as a means of payment in public transport, etc. A smart card used in mobile phones is a so-called SIM card, which in modern mobile phones is typically a small-sized mini-card inserted in the telephone. The function of the card is, for instance, to store subscriber data and identifications (PIN, Personal Identification Number), and thus the card determines the subscriber number of the telephone. The SIM card can also contain a stored list of telephone numbers or a group of short messages, as well as various data and set values related to the communication network used. This data is utilized increasingly by different applications at the same time when the quantity of data to be stored in the smart card is increased and diversified.

In the following specification, the smart card is used as an example of a local resource in connection with which it is possible to apply the invention. It is, of course, obvious that within the scope of the claims, the invention can also be applied to utilize another local resource, in order to avoid the above described problems and to gain advantages.

FIG. 1 also presents a smart card SC, known as such, which is a mini-card, i.e. a SIM card to be inserted in a mobile station. The smart card SC comprises means known as such which communicate with each other and which are intended to control the functions of the smart card SC and to implement data transmission (not shown in the figure). These means comprise, for example, a control unit (CPU) for controlling the function of the smart card on the basis of a program code stored in a program memory (ROM), and in a data memory (EEPROM) it is possible to store various user-specific data. During the function of the smart card SC, the random access memory (RAM) can be used as a temporary storage location for data. A bus adapter (DATA-I/O) on the smart card SC adapts the communication device functioning as a device for reading the smart card SC, for example a mobile station MS1, MS2, to connection lines, and to a control and data line. Physically, the smart card SC is coupled to the contacts available in the mobile station typically via its electrical contacts 4. The features and the purpose of the smart card SC can be set by storing an application software corresponding to the purpose of use, in the program memory of the card SC advantageously at the manufacturing stage of the card. However, new technologies that make it possible to download applications to the smart card are being developed. Also, the protocols related to the interface of the smart card SC in connection with data transmission are taken care of by the application software used.

Further referring to FIG. 1, the mobile station MS1 and MS2, for example a mobile phone, also comprises (not shown in the figure) means, known as such, for establishing a data transmission connection to the mobile communication network, means for reading the data of the smart card SC, such as a SIM card, and for storing the data on the SIM card, a control unit (CU) for controlling the different functions of the mobile station, which control unit advantageously comprises a micro controller unit (MCU) and a control logic circuit, such as an ASIC circuit (Application Specific Integrated Circuit). The functions include for example controlling the display and reading the keypad. The control unit also contains a memory attached to it, such as a read-only memory (ROM) and a random access memory (RAM). The function of the mobile station is controlled by means of an application software, which is responsible e.g. for implementing the protocols used in data transmission. The function of the mobile station is prior art known by anyone skilled in the art, and thus it is not necessary to describe it in more detail in this context. Known devices include the Nokia 8110, 6110 and 3110 mobile phones. As is well known, there are also devices available which contain two different user interfaces, for example the user interfaces of a mobile phone and a PDA device (Personal Digital Assistant). One such known device is the Nokia 9000 Communicator.

The aforementioned WAP application protocol is used in the following specification as an example of data transmission protocols to clarify the method according to the invention which is the object of this specification. In the following specification, said WAP clients and WAP servers refer advantageously to the clients and servers applying the WAP application protocol in the communication network. It is, of course, obvious that within the scope of the claims, it is also possible to apply the invention in connection with another application protocol, wherein the WAP indication mentioned in this specification will be used to refer to the use of this application protocol.

With reference to FIG. 2a, the protocol stack 100 (WAP Protocol Stack) in an OSI layer model of an advantageous WAP compatible system contains the following layers listed downwards from the top layer:

an application layer 101 for the wireless application environment WAE, which also comprises functions for a browser, which functions comprise a wireless mark-up language (WML), a WMLScript command language, and WTA services and WTA interfaces for telephone functions and programming interfaces, as well as content formats necessary for presenting information, a wireless session protocol (WSP) of a session layer 102, a wireless transaction protocol (WTP) of a transaction layer 103, a wireless transport layer security protocol (WTLS) of a security layer 104, intended to be used in connection with a WAP transport protocol, a transport layer 105 for data packets of a wireless datagram protocol (WDP), which data packets also contain address information of the destination and other necessary information in addition to the actual data, different bearer services 106, which include for example transmission of short messages, circuit-switched data transmission and packet-switched data transmission.

To describe the different functions, the layer model advantageously refers to an ISO/OSI layer model known as such. The upper layers (WAE, WSP, WTP, WTLS) of the WAP architecture are independent of the data transmission network used, but the WDP layer 105 has to be applied according to the data transmission method used at a time, for example on the basis of the GSM network or special requirements. The WAP protocol stack also allows other services and applications 107 to utilize the WAP stack by means of specified interfaces.

FIGS. 7a and 7b illustrate the above-described alternative methods for utilizing a local resource. However, these methods entail problems which the invention aims to eliminate. FIG. 7a presents the use of a fixed API interface 70 to utilize a smart card SC, for example to read the content of a file contained in the smart card. In this context, an advantageously standardized interface 72 of the smart card SC is utilized. FIG. 7b presents another alternative, in which the necessary functions 71, advantageously references to the system functions of the smart card SC, are included in a WAE application 101 to utilize the smart card SC directly by means of the application 101. By means of the invention, however, the aim is to utilize the functions and definitions of the protocol stack 100 presented in FIG. 2a.

The purpose of the data transmission network and system is to provide the clients and servers located in the network with a communication channel, wherein the protocol stack 100 is utilized at the same time according to FIG. 2b in a way known as such. FIG. 2b presents the described logical structure of the client/server hierarchy, which comprises a client 1 located in a mobile station MS and a server 3 located in a communication network. WAE applications 101 (i.e. clients 1) make a request to the WSP layer 102 by means of available command primitives. The layer 102 in question transmits the request further to the server 3.

FIG. 3 presents the application of the invention, wherein the server 3 (i.e. the interface 4 of the smart card) is located in the same device MS with the client. Logically, the server 3 seems to be located in the communication network, wherein the request made by the client 1 is conducted according to the invention as if the server in question was a conventional server. According to the invention, the protocol layers are responsible for transmitting the request to the smart card SC interface 4. WAE applications 101 use the service primitives provided by the WSP layer 102 to transmit requests to the server 3. The server 3 processes the request and transmits a response to the client 1 (i.e. to the application 101). The primitive types of these service primitives can be divided for example into following types known as such:

the request conducted by an upper layer to obtain services from a lower layer, the indication by means of which the layer providing services notifies an upper layer e.g. of a request made by a client or an activity initiated by the protocol, the response, by means of which an upper layer notifies a lower level that it has received an indication, the confirmation, by means of which the layer providing services confirms the maker of the request that the function is completed successfully.

The primitive types describe logical data transmission between adjacent layers in an abstract manner, and, unlike the API interface, they are not used to describe the actual implementation in detail.

According to FIG. 3, the use of two protocol stacks 100 in the same device MS is not necessary when implementing the invention, but it is possible to use one protocol stack 100 according to FIG. 4. According to the first preferred embodiment of the invention, it is possible to notice in the WSP layer 102 that the URL address, i.e. the network address, used by the application 101, advantageously a browser, refers to the smart card SC, wherein requests can be addressed directly to the smart card interface 4. With reference to FIG. 5, according to the second preferred embodiment of the invention, the interface 4 of the smart card can be logically located above the WDP layer 105, wherein the port numbers included in the request can be used to separate the smart card SC and the applications 101 of the communication device from each other. Thus, a separate port number i.e. a port is allocated for the interface 4 of the smart card.

The interface 4 of the smart card can also be logically located above the WTLS layer 104, wherein it is possible to utilize the functions of the security layer 104 in request transmission. Correspondingly, the interface 4 of the smart card can also be located above the WTP layer 103, especially in the case of connection-oriented data transmission. In both aforementioned cases, a separate port number is allocated for the interface 4 of the smart card.

Further referring to FIG. 5, according to a preferred embodiment of the invention, the WAE application 101 transmits a request to a local resource, advantageously to the smart card SC, by using the service primitives of the WSP layer 102. Correspondingly, the interface 4 of the smart card conducts the request to the smart card SC. The smart card SC gives a response to the interface 4 of the smart card, which generates a necessary response and transmits it to the WAE application 101. In more detail, the smart card SC is defined as a new server 3, which responds to requests related to the smart card SC. Thus, with respect to the WAE application 101, the smart card SC is like any server 3 located in the communication network, wherein logical transaction corresponds to the normal transaction of the protocol stack 100 according to FIG. 3. Requests are not, however, always directed to the communication network, but lower layers direct the requests to the interface 4 of the smart card, which can be located physically in the same device (MS) with the WAE application.

The WSP layer provides means for exchanging the information content between the applications of the client 1 and of the server 3. The services and protocols defined (WSP/B, Wireless Session Protocol/Browsing) are adapted especially for browser type applications. The WSP/B contains protocols both for a transport service of packets (datagram) in connectionless data transmission and for a transaction service of the session service in connection-oriented data transmission. The WSP/B follows closely the definitions of the HTTP data transmission protocol and supports applications which are HTTP/1.1 compatible. For example, methods such as GET, PUT and POST used by the HTTP can be used to retrieve (GET) or to transmit (PUT, POST) information. The header fields of the HTTP protocol can be utilized for giving information related to the content type of the message. It is also possible to use the header of the HTTP protocol for authentication. Correspondingly, the methods of the WWW communication network for authorization and data transmission can be utilized efficiently.

The invention is implemented in the WSP layer in such a way that the data transmission protocol used is deduced from the URL address, for example in this context "sc://", referring to the smart card, and the server used, described by the "<host>" part of the URL address. The requests whose address information begins with a reference "sc:///", are, according to the invention, directed to the interface of the smart card. According to the first preferred embodiment of the invention, and with reference to FIG. 4, this is effected via the WSP layer 102, and according to the second preferred embodiment of the invention and with reference to FIG. 5, this is effected via the WDP layer 105.

According to a preferred embodiment of the invention, the URL address to be used is formulated in the following way when the local resource is a smart card:

sc://<host>:<port>/<url-path>, in which the "sc://" part refers to the smart card and the "<host>" part to the device to which the smart card is connected. When the "<host>" part is omitted, it can be assumed that the address refers to a smart card connected physically to the same mobile station. The "<port>" part can also be omitted, if a default port is used. Since a mobile station can simultaneously contain various smart cards, which, in turn, contain several different files which one wishes to browse or retrieve information from, these are separated from each other by means of the "<url-path>" part, for example in the following way:

sc:///sim/_7F2A/_6FO5.

In the following, an implementation of the invention according to FIG. 5 will be described, in which the smart card interface 4 is located above the WDP layer 105. The WDP layer 105 is located above bearer services 106 which are supported by different communication networks (GSM, GSM GPRS, etc). In this context, for example the communication system according to FIG. 1 will be utilized in a way known as such. The WDP layer 105 provides services for upper layers 101–104, which can thus be in transparent communication via the available bearer services 106. By means of the used port number, an upper layer entity is identified, which can be a WTP transport protocol 103, a WSP session protocol 102 or an application 101.

FIG. 6 presents a command sequence for using a local resource, especially a smart card SC, by means of a WAP application 101 (browser) particularly in connectionless data transmission. In the example, a request is made by means of a GET method to a SIM card 4 coupled to a mobile station MS. By means of a user interface (UI) 5, the user enters (stage 201) in a WAE application 101, which is e.g. a browser, a determined URL address 6, in which the "sc:///" part refers to the smart card SC, i.e. SIM card 4, coupled to the mobile station MS in question. The address entered by the user has, for example, the format "sc:///sim/SomeApplication/SomeFile". At the next stage 202, the browser 101 calls the service primitives of connectionless data transmission in the WSP layer 102, in order to transmit a GET request to the smart card interface 4. Here, the WSP layer 102 uses (stage 203) a corresponding command primitive of the WDP layer 105, in order to transmit a WSP/B request to the smart card interface 4. A destination address used in the request refers to the mobile station MS itself, and a destination port number refers to a default port number allocated for the smart card interface 4. The request used in FIG. 6 (stage 203) is an service primitive T-DUnitdata, known as such, which is used to transmit data in a datagram, and by means of which it is possible to transmit parameters describing the destination address, the destination port, i.e. the address of the application 101 connected to the destination address, the source address, the source port, and user data transmitted by the WDP protocol 105. In the request, all this information has to be given, but in an indication, the destination address, the destination port and the user data are advantageously sufficient. The destination address can also be an individualizing MSISDN number, an IP address, an X0.25 address, or another identification, known as such. The parameters are transmitted in a way known as such in packet transmission, wherein the packet contains for example header information and data, which information is coded in the packet into bit sequences of fixed size, typically octets, which are transmitted by means of the data transmission method used.

With reference to FIG. 6, at the next stage, the WDP layer 105 detects that the destination address belongs to a local mobile station MS, i.e. to the wireless communication device MS, to which the smart card SC is coupled as well, wherein the indication is transmitted (stage 204) to the appropriate port in the smart card interface 4. The smart card interface 4 processes the indication and processes the WSP/B request by making the necessary requests to the smart card SC (stage 205). After this, the smart card SC gives the content of the desired file to the smart card interface 4 (stage 206), after which the interface 4 encapsulates the content in the WSP/B response and transmits (stage 207) it as a request to the WDP layer 105. At the next stage 208, it is detected in the WSP layer 102 that the destination address and the destination port of the request belong to the browser 101 of the local mobile station MS, and the indication is transmitted (stage 208) to the WSP layer. After this, the WSP layer 102 transmits (stage 209) a WSP/B response to the browser 101, and the browser 101 presents the content of the file to the user (stage 210), advantageously by using the user interface 5. The aforementioned WSP/B requests and responses can contain necessary header information, related, for example, to the content type of the message and to the authentication and authorization of the user. Furthermore, they can include data relating to the compression method used and data for parity checking.

In the above-described example, the user activates the use of local resources by giving a URL address by means of the user interface of the mobile station, which user interface is implemented in a way known as such by utilizing the display and keypad of the mobile station. In a preferred embodiment of the invention, the application itself can effect the activation, typically in order to retrieve information stored in the memory of the SIM card. Furthermore, it is obvious that according to the invention, also a server coupled to the communication system can request information from the smart card coupled to the mobile station. FIG. 8 illustrates the invention further in its third preferred embodiment, wherein a local resource, for example a smart card SC, receives requests also from clients 1 (i.e. from browsers 101) other than those located in the same mobile station MS with the smart card SC. In this case, the interface 4 of the smart card operates like a server located in a network. In these different cases, the method already presented in FIG. 6 will be applied, which method can be implemented by anyone skilled in the art on the basis of the presented example. In this context, it has to be noted that the method also utilizes bearer services 106 according to FIG. 8 to transmit a request between mobile stations. The communication network available is also utilized therein.

The present invention is not restricted solely to the above described examples, but it can be modified within the scope of the appended claims. For example, the presented protocol stack can be implemented in a wireless communication device in which data transmission or the communication system is based on the previously mentioned IR, LPRF, SDRF data transmission, and in which the used bearer service is adapted for this data transmission.

What is claimed is:

1. A method in a communication system, which system (N, PLMN, PSTN, PDN) is arranged for transmitting information, requests (REQUEST), between a first mobile station (MS, MS1, MS2), a second mobile station .(MS, MS1, MS2) and a server (3, SERVER) connected to the communication system (N, PLMN, PSTN, PDN), wherein at least the first mobile station (MS, MS1, MS2) and at least the second mobile station (MS, MS1, MS2) comprise protocol means (100–106) for generating the request (REQUEST) and directing it to the communication system (N, PLMN, PSTN, PDN), which request (REQUEST) contains at least address information (URI, URL, URN) for identifying the destination of the request (REQUEST), and wherein at least the first mobile station (MS, MS1, MS2) comprises a first local resource (SC, 4) coupled to the same, and in which method:

the request (REQUEST) is transmitted by the first mobile station (MS, MS1, MS2), the second mobile station (MS, MS1, MS2), or the server (3, SERVER), characterized in that:

the address information (URI, URL, URN) of the request (REQUEST) is generated to identify said first local resource (SC, 4), and that the request (REQUEST) for said first local resource (SC, 4) is generated and directed at least partly with said protocol means (100–106).

2. The method according to claim 1, characterized in that:

the request (REQUEST) is generated in the second mobile station (MS, MS1, MS2), or in the server (3, SERVER), that the first local resource (SC, 4) coupled to the first mobile station (MS, MS1, MS2) is selected as the destination for the request (REQUEST), and that the request (REQUEST) is transmitted at least partly by means of the communication system (N, PLMN, PSTN, PDN).

3. The method according to claim 1, characterized in that:

the request (REQUEST) is generated in the first mobile station (MS, MS1, MS2), that the first local resource (SC, 4) connected to the first mobile station (MS, MS1, MS2) is selected as the destination for the request (REQUEST), and that the request (REQUEST) is transmitted and directed by with the protocol means (100–106) of the first mobile station (MS, MS1, MS2).

4. The method according to claim 1, characterized in that the request (REQUEST) is generated at least partly by a local resource (SC, 4) connected to the second mobile station (MS, MS1, MS2), or to the server (3, SERVER).

5. The method according to claim 1, characterized in that address information (URI, URL, URN) identifying the local resource (SC, 4) is entered into the application (101, BROWSER) by the user, to retrieve information from said local resource (SC, 4), which application (101, BROWSER) is provided in the mobile station (MS, MS1, MS2) advantageously to present information for the user by means of a user interface (UI) of the mobile station (MS, MS1, MS2), and which application (101, BROWSER) is connected to the protocol means (100–106) to transmit said address information (URI, URL, URN).

6. The method according to claim 1, characterized in that the request (REQUEST) is transmitted advantageously to receive an indication (INDICATION) from the local resource (SC, 4), which indication (INDICATION) is directed at least partly with the help of said protocol means (100–106) to the mobile station (MS, MS1, MS2) or server (3, SERVER) which made the request (REQUEST).

7. The method according to claim 1, characterized in that a WAP application protocol is applied to establish the protocol means (100–106).

8. The method according to claim 7, characterized in that a connection is established at least from a WSP layer (102), a WTP layer (103), a WTLS layer (104), or a WDP layer (105) to an interface (4, SC INTERFACE) of said local resource (SC, 4), which interface (4, SC INTERFACE) is connected to said local resource (SC, 4), and which WSP layer (105), WTP layer (103), WTLS layer (104), or WDP layer (105) forms at least a part of the protocol means (100–106) of the WAP application protocol.

9. The method according to claim 1, characterized in that a URI address, a URL address, or a URN name is used as address information.

10. The method according to claim 1, characterized in that a smart card, such as a SIM card, connected to the mobile station (MS, MS1, MS2) is used as a local resource (SC, 4).

11. A communication system, which system (N, PLMN, PSTN, PDN) is arranged for transmitting information requests (REQUEST) between a first mobile station (MS, MS1, MS2), a second mobile station (MS, MS1, MS2) and a server (3, SERVER) connected to the communication system (N, PLMN, PSTN, PDN), wherein these comprise protocol means (100–106) for generating a request (REQUEST) and directing it to the communication system (N, PLMN, PSTN, PDN), which request (REQUEST) contains at least address information (URI, URL, URN) for identifying the destination of the request (REQUEST), and wherein at least the first mobile station (MS, MS1, MS2) comprises a first local resource (SC, 4) connected thereto, characterized in that:

said first local resource (SC, 4) is arranged to be identified by means of the address information (URI, URL, URN) of the request (REQUEST), that the request (REQUEST) addressed to said first local resource (SC, 4) is arranged to be generated and directed to said first local resource (SC, 4) at least partly with the help of said protocol means (100–106), and that the communication system (N, PLMN, PSTN, PDN) is arranged to transmit the request (REQUEST) addressed to said first local resource (SC, 4) by the second mobile station (MS, MS1, MS2) and/or the server (3, SERVER).

12. A wireless communication device comprising protocol means (100–106) for generating a request (REQUEST) and directing it to a communication system (N, PLMN, PSTN, PDN), which request (REQUEST) contains at least address information (URI, URI, URN) to identify the destination of the request (REQUEST), and which wireless communication device (MS, MS1, MS2) advantageously comprises a local resource (SC, 4) connected thereto, characterized in that:

the local resource (SC, 4) is arranged to be identified by means of the address information (URI, URL, URN) of the request (REQUEST), and that said protocol means (100–106) are arranged for directing the request (REQUEST), addressed to said local resource (SC, 4), to said local resource (SC, 4).

13. The wireless communication device according to claim 12, characterized in that said protocol means (100–106) are arranged for directing and transmitting a request (REQUEST) received by said wireless communication device (MS, MS1, MS2), a request (REQUEST) generated in said wireless communication device (MS, MS1, MS2), or a request (REQUEST) according to both these alternatives, to said local resource (SC, 4).

14. The wireless communication device according to claim 12, characterized in that said protocol means (100–106) are arranged also to direct and transmit an indication (INDICATION) received as a response to the request (REQUEST) from the local resource (SC, 4).

15. The wireless communication device according to claim 12, characterized in that said protocol means (100–106) are also arranged for directing and transmitting the request (REQUEST) generated by said local resource (SC, 4).

16. The wireless communication device according to claim 12, characterized in that the local resource (SC, 4) is a smart card, such as a SIM card.

17. The wireless communication device according to claim 12, characterized in that the address information (URI, URL, URN) comprises a URI address, a URL address, or a URN name.

* * * * *